P. ENGLISH.
DIRECT AND REVERSE DRIVING MECHANISM.
APPLICATION FILED DEC. 27, 1910.
1,006,638.
Patented Oct. 24, 1911.
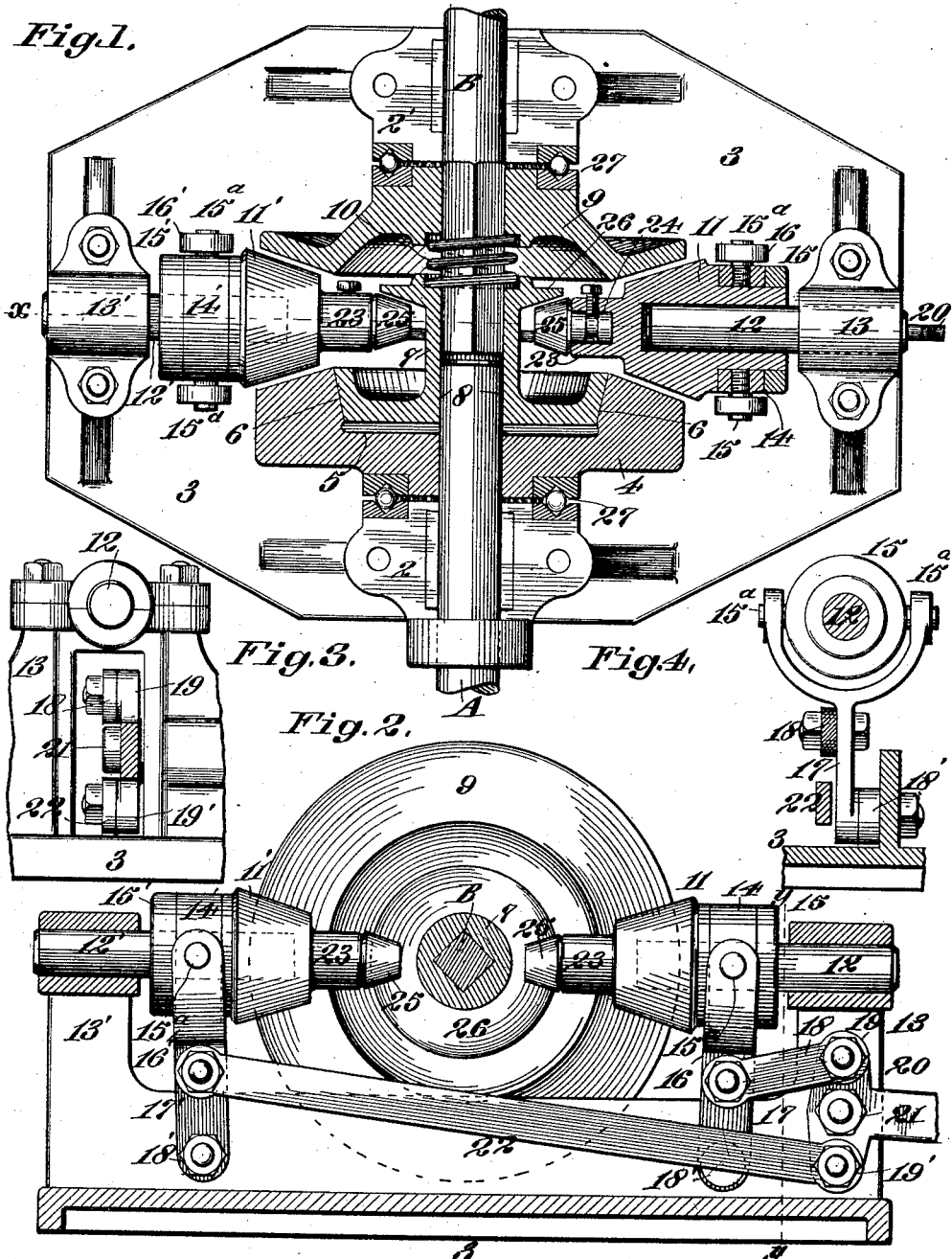
Witnesses:
Charles Pickles
R. A. Berry
Inventor:
Peter English
By Geo. H. Strong
atty

UNITED STATES PATENT OFFICE.

PETER ENGLISH, OF SAN FRANCISCO, CALIFORNIA.

DIRECT AND REVERSE DRIVING MECHANISM.

1,006,638. Specification of Letters Patent. Patented Oct. 24, 1911.

Application filed December 27, 1910. Serial No. 599,463.

*To all whom it may concern:*

Be it known that I, PETER ENGLISH, citizen of the United States, residing in the city and county of San Francisco and State of California, have invented new and useful Improvements in Direct and Reverse Driving Mechanism, of which the following is a specification.

This invention relates to a direct and reverse driving mechanism, and particularly pertains to a device for changing the direction of rotation of a propeller shaft.

It is the object of this invention to provide a simple and practical means for changing the direction of rotation of a driven shaft from a driving shaft, and by means of which a driven shaft can be thrown in or out of operative connection with the driving shaft, either from the straight-ahead or from the reverse rotation.

The invention consists of the parts and the combination and construction of parts as hereinafter more fully described and claimed, having reference to the accompanying drawings, in which—

Figure 1 is a horizontal sectional view of the invention, showing parts in elevation. Fig. 2 is a vertical section of the invention on the line X—X, Fig. 1, partly in elevation. Fig. 3 is a fragmentary side elevation, partly in section. Fig. 4 is a vertical section on the line Y—Y, Fig. 2.

In the drawings, A represents the driving shaft, which is supported at its outer end in a bearing 2, on a bed-plate 3. This driving shaft A is adapted to be driven directly or indirectly by a motor or engine of any suitable type or construction. The outer end of the driving shaft A extends beyond the bearings 2, and has a fly wheel clutch member 4 mounted thereon, the fly wheel 4 being keyed to the shaft A to rotate therewith. The outer face of the fly wheel 4 is recessed at 5 to receive a male clutch member 6, which is beveled on its periphery in the form of a truncated cone, the conical peripheral surface of the clutch member 6 conforming to a corresponding bevel on the inner arcual surface of the rim of the recess 5.

The clutch member 6 has a hub 7 formed on its inner face, through which a centrally disposed bore 8 extends longitudinally. The forward half of the bore 8 is circular to receive the outer end of the driving shaft A, which is revoluble therein, and the outer portion of the bore 8 is rectangular in cross section to receive the rectangular inner end of a driven shaft B, and is slidable longitudinally thereon. This driven shaft B is mounted in a bearing 2' on the bed-plate 3 and is designed to operate a propeller of any suitable description, or any other machinery or devices, as may be desired.

Rigidly mounted near the inner end of the driven shaft B on the rectangular portion thereof, is a disk 9, which is designed to be thrown in or out of frictional engagement with the fly wheel clutch 4, as will be later described. A stiff coil spring 10 wound on the rectangular portion of the driven shaft B, is disposed between the inner face of the disk 9 and the outer end of the hub 7 on the clutch member 6. This spring 10 normally tends to retain the clutch member 6 in frictional engagement with the fly wheel clutch 4.

From the foregoing, it will be seen that when the clutch member 6 is normally engaged with the fly wheel clutch 4, as just described, and as shown in Fig. 1 of the drawings, the rotation of the shaft A will be transmitted directly to the shaft B by reason of the frictional engagement between the clutch members 4 and 6, and the keyed connection between the clutch 6 and the shaft B. The rectangular portion of the shaft B extending into the rectangular recess in the clutch 6 insures the shaft B and the clutch member 6 rotating in unison.

Means are provided for throwing the clutch member 6 on the shaft B out of engagement with the fly wheel clutch member 4 on the shaft A and to throw the disk 9 into frictional engagement with the cones 11—11' so as to reverse the direction of rotation of the driven shaft B. This means consists of oppositely disposed cones 11 and 11', which extend between the disk 9 and the fly wheel clutch 4, the outer portion of the inner faces of the fly wheel clutch 4 and the disk 9 being beveled to correspond to the taper of the cones 11 and 11'. These cones 11 and 11' are revolubly mounted on studs 12 and 12', mounted on standards 13 and 13' formed on the bed-plate 3, and have hubs formed on their outer ends on which loose sleeves 14 and 14' are mounted and held in place on the hubs by collars 15 and 15'. Laterally extending and oppositely disposed pins 15ᵃ are mounted on the sleeves 14 and 14' and engage with yokes 16 and 16' which are mounted on the upper ends of arms 17 and 17' pivoted at 18' at their lower ends to an upwardly extending rib formed on the bed-plate 3. The arm 17 is connected by a link 18 to an upwardly extending arm 19 on a bell-crank lever 20 which is fulcrumed at 21, and the arm 17' is connected by a link 22 to a downwardly extending arm 19' on the bell-crank lever 20.

Formed on the inner end of each beveled frictional gear 11 and 11' is a hub 23, in which is fitted a stem 24, formed on a beveled roller 25. The stem 24 is held in position in the hub 23 by means of a screw which extends into a peripheral channel in the stem 24. This construction admits of the beveled roller 25 and its stem 24 rotating freely within the hub 23, and preventing the roller 25 and stem 24 from being disconnected from the hub 23. The beveled rollers 25 normally extend into close proximity to and just out of contact with a beveled flange 26 formed on the outer end of the hub 7 on the clutch member 6.

As before stated, the shaft B is normally engaged with the driving shaft A by means of the frictional clutch members 4 and 6, and when thus connected the driven shaft B will be rotated in unison with, and in the same direction as, the shaft A. To reverse the direction of rotation of the shaft B the lever 20 is rocked on its pivotal bearing or fulcrum 21, so as to move the arm 19 inwardly and the arm 19' outwardly. This action causes the link 18 to move the arm 17 with its yoke 16 and the cone 11 inwardly to throw the latter into frictional engagement with the beveled faces on the disk 9 and the fly wheel 4. Simultaneous with this action the link 22 will pull upon the lever 17 so as to throw the friction cone 11' into engagement with the disk 9 and the fly wheel 4. As the friction cones 11 and 11' move inwardly, the beveled rollers 25 come into contact with beveled flanges 26. A continued inward movement of the cones 11 and 11' causes the roller 25 to act on the flange 26, on the principle of a wedge, to move the frictional clutch 6 backward on the rectangular portion of the shaft B in opposition to the spring 10, thus throwing the clutch 6 out of engagement with the fly wheel 4. A further continued inward movement of the cones 11 and 11' causes them to come in contact with and be frictionally engaged by the disk 9 and fly wheel 4 so as to cause the former to be rotated in a direction opposite to that of the latter, thereby reversing the direction of rotation of the driven shaft B.

The rollers 25 are normally disposed in closer proximity to the flange 26 than the cones 11 and 11' are to the faces of the clutch members 4 and 6, so that the clutch member 6 may be thrown out of contact with the fly wheel 4 before the frictional gears 11 and 11' are in operative engagement with the disk 9 and the fly wheel 4. This permits of the driven shaft B being thrown out of operative connection with the drive shaft A.

End-thrust bearings 27 are disposed between the disk 9 and the bearings 2' and similar end-thrust bearings 27' are disposed between the fly wheel 4 and the bearings 2. The purpose of these bearings is to take up end-thrusts of the disk 9 and the fly wheel 4 as is common in frictional disk construction.

In the application of this invention as just described, the clutch member 6 is normally engaged with the fly wheel 4 for a straight-ahead drive of the shaft B, a reversal of the shaft B being obtained by throwing in the frictional cones 11 and 11'. It is obvious, however, that the opposite arrangement may be employed if desired; that is to say, the straight-ahead drive may be obtained by normally disposing the frictional cones 11 and 11' in engagement with the disk 9 and fly wheel 4. In this case, a reversal of the direction of rotation of the shaft B will be obtained by throwing out the friction cones 11 and 11' so as to cause the spring 10 to automatically throw the clutch 6 into engagement with the fly wheel 4.

Having thus described my invention, what I claim and desire to secure by Letters-Patent, is—

1. The combination with a drive shaft and a driven shaft, of a fly-wheel on the drive shaft, a friction clutch member on the driven shaft normally engaged with the fly-wheel, a friction disk on the driven shaft, friction cones disposed between said friction disk and said fly wheel out of contact therewith, means for throwing said friction cones into engagement with the fly wheel and friction disk, and means on said cones for throwing the friction clutch member out of engagement with the fly wheel.

2. The combination with a drive shaft and a driven shaft disposed in longitudinal alinement, of a fly wheel on the drive shaft having a recess therein and a beveled surface adjacent its perimeter, a friction clutch member slidable on the driven shaft and rotatable therewith, yieldable means for normally retaining said clutch member in the recess in the fly wheel and in engagement with the sides thereof, a friction disk on the driven shaft, and oppositely disposed friction cones between said friction disk and the beveled surface of the fly wheel.

3. The combination with a drive shaft and a driven shaft disposed in longitudinal alinement, of a fly wheel on the drive shaft having a recess therein and a beveled surface adjacent its perimeter, a friction clutch member slidable on the driven shaft and rotatable therewith, yieldable means for normally retaining said clutch member in the recess in the fly wheel and in engagement with the sides thereof, a friction disk on the driven shaft, oppositely disposed friction cones between said friction disk and the beveled surface of the fly wheel, means for moving said cones into engagement with the fly wheel and friction disk, and means on said cones for throwing the friction clutch member out of engagement with the fly wheel.

4. The combination with a drive shaft and a driven shaft disposed in longitudinal alinement, of a fly wheel on the drive shaft having a recess therein and a beveled surface adjacent its perimeter, a friction clutch member slidable on the driven shaft and rotatable therewith, a spring on the driven shaft to normally retain the clutch member in engagement with the fly wheel, a friction disk on the driven shaft, a pair of friction cones, tapered rollers on said cones, means for throwing said cones into engagement with the fly wheel and the friction disk, and means coöperating with said tapered rollers to disengage said clutch member from said fly wheel when the friction cones are in operative engagement.

5. The combination with a drive shaft and a driven shaft, of a fly wheel on the drive shaft, a friction clutch member on the driven shaft and a friction disk fixed on the driven shaft, means for normally engaging said clutch to said fly wheel to rotate the driven shaft in one direction, friction cones, means for engaging said cones to the fly wheel to reverse the direction of rotation of the driven shaft, and means on said cones for disengaging the friction clutch.

6. The combination of a drive shaft, a driven shaft, bearings supporting the ends of said shafts, a bed-plate on which the bearings are mounted, a fly-wheel on the drive shaft, having a recessed portion and a beveled portion, a flanged friction clutch member on the driven shaft normally engaging the fly wheel to rotate the driven shaft in one direction, a friction disk on the driven shaft, friction cones, spindles on which they are mounted and supporting standards on said bed plate, beveled rollers on said friction cones adapted to bear against the flange formed on the friction clutch member, and means for shifting said cones on the spindles.

7. The combination of a drive shaft, a driven shaft, bearings supporting the ends of said shafts, a bed-plate on which the bearings are mounted, a fly-wheel on the drive shaft, having a recessed portion and a beveled portion, a flanged friction clutch member on the driven shaft normally engaging the fly wheel to rotate the driven shaft in one direction, a friction disk on the driven shaft, friction cones, spindles on which they are mounted, supporting standards on said bed plate, beveled rollers on said friction cones adapted to bear against the flange formed on the friction clutch member, means for shifting said cones on the spindles, said means embodying straps on the cones, rocking levers to which they are pivoted, a bell crank lever and links connecting said levers to oppositely disposed arms on said bell crank lever.

In testimony whereof I have hereunto set my hand in the presence of two subscribing witnesses.

PETER ENGLISH.

Witnesses:
CHARLES EDELMAN,
A. P. LATHROP.

---

Copies of this patent may be obtained for five cents each, by addressing the "Commissioner of Patents, Washington, D. C."